United States Patent [19]

La Flame

[11] 4,221,005
[45] Sep. 2, 1980

[54] PSEUDONOISE CODE TRACKING LOOP

[76] Inventor: Robert A. Frosch, Administrator of the National Aeronautics and Space Administration, with respect to an invention of David T. La Flame, Los Angeles, Calif.

[21] Appl. No.: 41,142

[22] Filed: May 21, 1979

[51] Int. Cl.[3] ............................................. H04K 1/04
[52] U.S. Cl. ...................................... 375/1; 375/115; 375/58
[58] Field of Search ...................... 325/32, 42, 65, 321, 325/323, 324, 419, 320; 329/50, 122; 178/69.1, 67, 88, 66 R; 340/146.1 D

[56] References Cited

U.S. PATENT DOCUMENTS

| | | | |
|---|---|---|---|
| 3,305,636 | 2/1967 | Webb | 178/69.1 |
| 4,039,749 | 8/1977 | Gordy et al. | 325/320 |
| 4,122,393 | 10/1978 | Gordy et al. | 325/324 |

*Primary Examiner*—Benedict V. Safourek
*Attorney, Agent, or Firm*—Russell E. Schlorff; John R. Manning; Marvin F. Matthews

[57] ABSTRACT

A delay-locked loop is provided for tracking a pseudonoise (PN) reference code in an incoming communication signal. The loop is less sensitive to gain imbalances, which can otherwise introduce timing errors in the PN reference code formed by the loop.

15 Claims, 2 Drawing Figures

PSEUDONOISE CODE TRACKING LOOP

BACKGROUND OF INVENTION

1. Field of Invention

The present invention relates to pseudonoise code tracking loops.

2. Description of Prior Art

Various types of loops have been proposed for receivers to track an incoming signal. Some, such as in U.S. Pat. Nos. 3,710,261; 3,806,815; 3,828,138; 3,943,468 and 4,027,265 have used phase-locked loops for tracking purposes. Others, such as in U.S. Pat. Nos. 3,402,265 and 3,947,634 have formed a local pseudonoise sequence which was used for synchronization purposes.

Two other types of tracking loops were also known. A first type, known as a delay-locked loop, was described in an article "Noncoherent Pseudonoise Code Tracking Performance of Spread Spectrum Receivers", I.E.E.E. Transactions on Communications, Vol. com-25, No. 3, March, 1977, at pages 327-345. These delay-locked loops had two signal processing sections or arms which were used to form a loop error signal for use in tracking. In the event of gain imbalance in these two arms, however, direct current offset or bias was caused in the loop error signal, which resulted in a d.c. timing error in the reference code formed by the loop.

A second type of tracking loop was known as a "tau-dither" loop and was used as a tracking loop in place of the delay locked loop to alleviate the gain imbalance discussed above. However, although the tau-dither loop apparently overcame gain imbalance problems, it did not exhibit comparable tracking performance to the delay locked loop. The performance differences of the tau-dither loop could cause tracking problems in communication systems where communication link margins were critical or where link margin problems arose.

SUMMARY OF INVENTION

Briefly, the present invention provides a new and improved tracking apparatus for forming a pseudonoise reference code from an incoming signal. A pseudonoise code is generated in the form of a multiple bit reference code in response to an error signal. The error signal is formed in a circuit receiving input product signals formed in multiplier circuits. The multiplier circuits form the product signals by multiplying the incoming signal by sum and difference signals representing the sum and the difference, respectively, of two selected bits of the reference code.

With the tracking apparatus of the present invention, gain levels in the arms affect only loop gain, so that the gain imbalance problems of the prior art are overcome, while also retaining performance advantages over the prior art tau-dither loop.

DESCRIPTION OF PREFERRED EMBODIMENT

Figure 2:
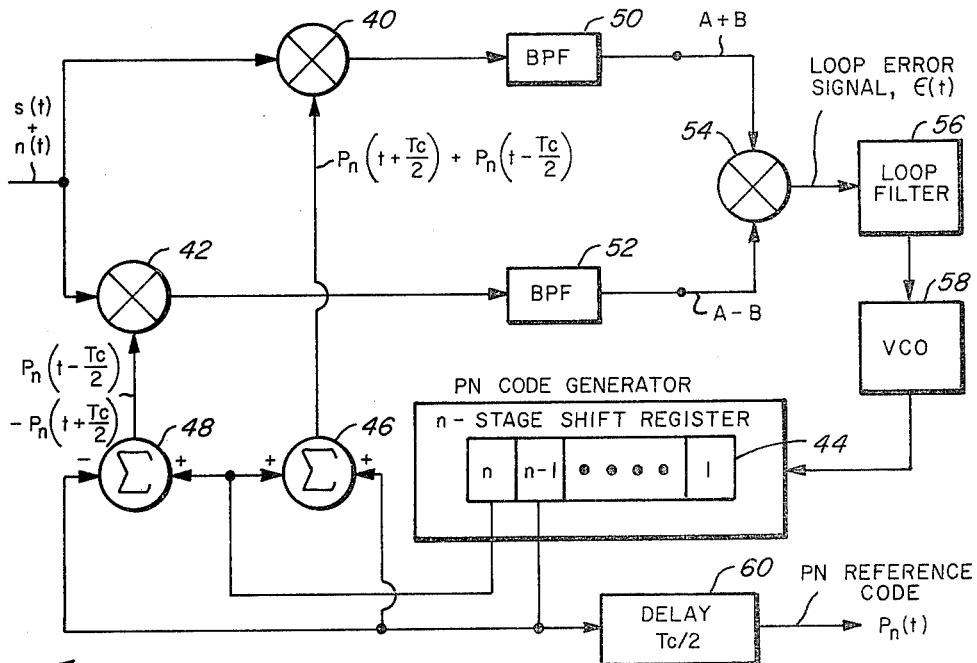
FIg. 2 is a schematic electrical circuit diagram of a pseudonoise tracking loop according to the present invention.

At the outset, a brief description of a prior art delay lock loop D is submitted to be beneficial, in order to more clearly understand the operation of the tracking loop L (FIG. 2) of the present invention. In the prior art delay lock loop D, an incoming signal in the form of a received signal S(t) having therewith a noise component N(t) is provided to signal processing arms 6 and 8, which include multipliers or product forming circuits 10 and 12, respectively. The multiplier 10 receives a second input signal $P_n(t-T_c/2)$, often termed a late reference code, formed in stage n of a shift register 14 which functions as part of a pseudonoise (PN) code generator, where Tc represents the chip period or time duration a digital bit is present in each stage of the shift register 14 during travel therethrough. Similarly, the multiplier 12 receives an input signal $P_n(t+T_c/2)$, known as an early reference code, from a stage n−1 of the shift register 14.

Each of the multipliers 10 and 12 forms a product signal from the two input signals provided thereto which are furnished to band pass filters 16 and 18, respectively. The band pass filters 16 and 18 form filtered output signals representing the product of the signal S(t) and the input signals to multipliers 10 and 12, respectively, which will hereinafter be referred to as A and B, respectively, for purposes of brevity.

Signals A and B from the filters 16 and 18 are furnished to square law devices 20 and 22 which form output signals $A^2$ and $B^2$, respectively, from the processing arms 6 and 8.

A summing function circuit 24 receives these signals $A^2$ and $B^2$ and forms a loop error signal $\epsilon(t)$ which is represented by the difference between the input signals $A^2$ and $B^2$. The loop error signal $\epsilon(t)$ is furnished to a loop filter 26 and therefrom to a voltage controlled oscillator (VCO) 28 which forms signals which are provided to the shift register 14 of the pseudonoise (PN) code generator. Stage n−1 of the shift register 14 is electrically connected to a delay circuit 30 with a time delay $T_c/2$ so that the signal transferred from the shift register 14 after such a time delay in the circuit 30 represents a pseudonoise reference code $P_n(t)$ As has been discussed above, a gain imbalance between the arm 6 and the arm 8 of the detector D caused an offset or bias in the loop error signal $\epsilon(t)$ which was transferred through the loop filter 26 and oscillator 28 to the shift register 14, in effect resulting in a direct current (DC) timing error in the referenced pseudonoise code $P_n(t)$.

considering now a pseudonoise code tracking loop L (FIG. 2) according to the present invention, the incoming signal $S(t)+N(t)$ is received at signal multiplier circuits 40 and 42. The multiplier circuits 40 and 42 further receive a pseudonoise reference code from a pseudonoise code generator including an n-stage shift register 44. However, with the present invention, in contrast to the prior art, a sum signal $P_n(t+Tc/2)+P_n(t-Tc/2)$ and a difference signal $P_n(t-Tc/2)-P_n(t+Tc/2)$ are formed in two summing function circuits 46 and 48.

The summing function circuit 46 receive the contents $P_n(t-Tc/2)$ from stage n of the shift register 44 at a first positive input. Similarly, the summing function circuit 46 receives the contents $P_n(t+Tc/2)$ of stage n−1 of the shift register 44 at a second positive input. The summing function circuit 46 thus forms the sum of the two input signals as the output signal $P_n(t+Tc/2)+P_n(t-Tc/2)$ which is furnished as a second input to the multiplier circuit 40. The multiplier circuit 40 thus forms a sum product signal by multiplying the output of the summing function circuit 46 with the incoming signal.

The summing function circuit 48 receives the contents $P_n(t-Tc/2)$ of stage n of the shift register 44 at a positive input and the contents $P_n(t+Tc/2)$ of the shift register 44 at a negative input. The summing function circuit 48 forms a difference signal as the sum of these two input signals, or $P_n(t-Tc/2)-P_n(t+Tc/2)$, due to receipt of one input signal at a negative input. The difference signal from circuit 48 is provided as an output signal which is furnished to the multiplier circut 42. The multiplier circuit 42 forms a difference product signal by multiplying the difference signal output of the summing function circuit 48 with the incoming signal.

Figure 1:
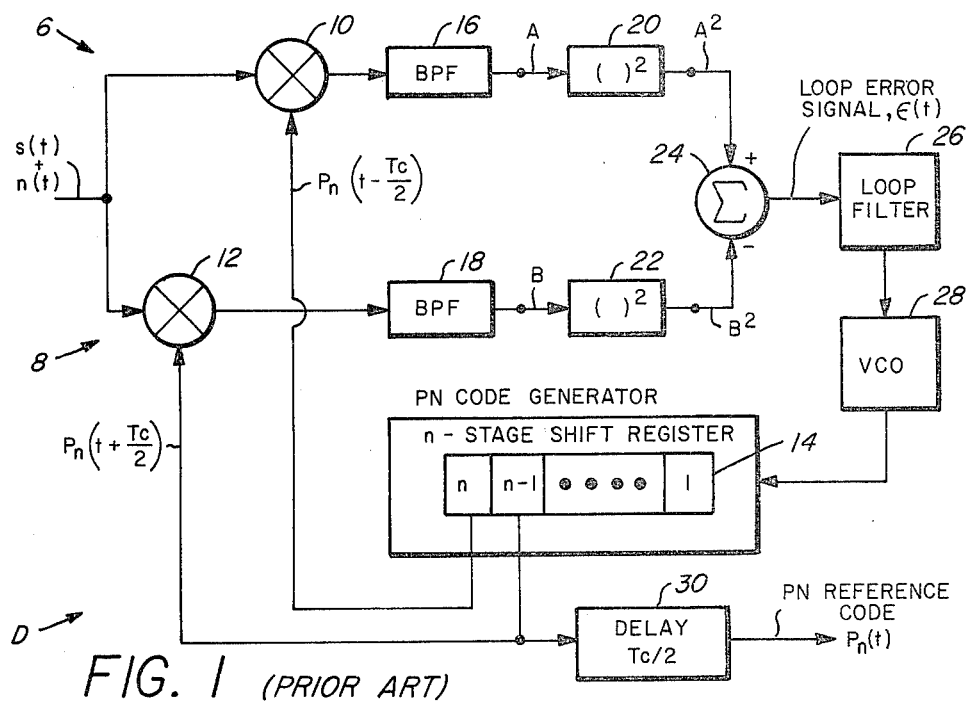
FIG. 1 is a schematic electrical circuit diagram of a prior art delay locked loop.

With the present invention, by forming the sum and difference signals in the summing circuits 46 and 48, the data content of both of the stages of the shift register 44 is present in the output sum and difference product signals formed in the multipliers 40 and 42. Accordingly, any gain imbalance between the multipliers 40 and 42 and their respective band pass filters 50 and 52 acts equally on the data content of both stages of the shift register 44. Thus, in contrast to the prior art loop D of FIG. 1, where a gain imbalance between the arms 6 and 8 affected only the data contents of one stage of the shift register, the adverse effect of gain imbalance on the loop error signal $\epsilon(t)$ is avoided.

A band pass filter 50 receives and passes signal components representing the product of the data portion S(t) of the incoming signal and the sum signal from the summing circuit 46. For convenience of reference, these components are referred to as A+B hereinafter in the drawings. Similarly, the output of the filter 52 includes components representing the product of the data portion S(t) of the incoming signal and the difference signal furnished to multiplier 42 from the summer 48. In a similar manner, these components for convenience of reference are referred to in the drawings as A−B. The output signals from the filters 50 and 52 are furnished to a multiplier circuit 54 which forms a product of the two signals furnished thereto which is furnished as a loop error signal $\epsilon(t)$ through a loop filter 56 and a voltage controlled oscillator 58 to furnish output signal to the shift register 44 in the pseudonoise code generator.

A time delay circuit with a time delay of $T_c/2$ is electrically connected to stage n−1 of the shift register 44 so that the data contents $P_n(t+Tc/2)$ of such stage, after the time delay of the time delay circuit 60, represents an output pseudonois reference code $P_n(t)$ which is formed in the loop L of the present invention.

From the foregoing, it can be seen that the loop L of the present invention avoids the problems caused by gain imbalance between two multipliers and filters present in the prior art loop D. Additionally, with the loop L, any imbalance in arm gain effects only the loop gain of the loop L, since it applies equally to both digital signals provided as output codes from the pseudonoise code generator for tracking purposes.

Furthermore, the loop L has equivalent tracking performance to the loop D. As has been set forth above, the loop error signal $\epsilon(t)$ formed in the loop D represents the difference between the outputs of the square law devices 20 and 22, or, $A^2-B^2$. In the loop L, the multiplier 54 receives the output signal A+B from the filter 50 and the output signal A−B from the filter 52 and multiplies these two signals together. Accordingly, the loop error signal $\epsilon(t)$ formed in the multiplier 54 represents the product of the two input signals or (A+B)×(A−B) or $A^2-B^2$, the identical loop error signal formed in the prior art loop D. Accordingly, the loop error signals are identical and the loops will thus have identical tracking performance.

From the foregoing, it can be seen that a new and improved tracking loop is provided with the present invention, overcoming problems of gain imbalance in the prior art tracking loops without requiring the decreased tracking performance of tau-dither loops experienced in the past.

It should further be understoor that the summing circuits 46 and 48 are shown as receiving two time successive signals from the shift register 44 as the early and late reference pseudonoise codes only by way of an exemplary embodiment. Any other time spacing to obtain early and late reference pseudonoise codes from the shift register 44 could equally as well be made. For example, for a shift register having n stages, where n is a number greater than 2, connection could be made for the late reference code to a stage n−y, where y is an integer 2 or larger but less than n.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

What is claimed is:

1. A tracking apparatus for forming a pseudonoise reference code from an incoming signal, comprising:
   (a) pseudonoise code generating means for forming a multiple bit pseudonoise reference code in response to a loop error signal;
   (b) means for forming signals representing the sum and the difference between two selected bits of the pseudonoise reference code;
   (c) first multiplier means for forming a first product signal from the sum signal and the incoming signal;
   (d) second multiplier means for forming a second product signal from the difference signal and the incoming signal;
   (e) means for forming the loop error signal from the first and second product signals to cause operation of said pseudonoise code generating means.

2. The tracking apparatus of claim 1, wherein said means for forming comprises:
   summing function circuit means.

3. The tracking apparatus of claim 2, wherein said summing function circuit means comprises:
   (a) a first summing function circuit for forming the sum of the two selected bits of the pseudonoise reference code; and
   (b) a second summing function circuit for forming the difference between the two selected bits of the pseudonoise reference code.

4. The tracking apparatus of claim 1, wherein said pseudonoise code generating means comprises:
   a multiple stage digital signal storage means.

5. The tracking apparatus of claim 4, wherein said multiple stage digital storage means comprises:
   a multiple stage shift register having n stages, wherein n is a positive integer greater than one.

6. The tracking apparatus of claim 5, wherein said means for forming comprises:
   means for forming signals representing the sum and the difference between the contents of stages n and n−1 of said shift register.

7. The tracking apparatus of claim 6, wherein said means for forming comprises:

means for forming signals representing the sum and the difference between the contents of stages n and n−y, wherein y is an integer greater than 1 but less than n.

8. The tracking apparatus of claim 1, further including:
   (a) loop filter means for receiving the loop error signal and forming therefrom an output signal whose voltage varies in accordance with the error signal; and
   (b) voltage controlled oscillator means.

9. The tracking apparatus of claim 1, further including:
   band pass filter means electrically connected at the output of each of said first multiplier means and said second multiplier means.

10. The tracking apparatus of claim 1, wherein said means for forming the loop error signal comprises:
    means for multiplying the first and second products signals together to form the loop error signal.

11. A method of forming a pseudonoise reference code from an incoming signal, comprising:
    (a) generating a multiple bit pseudonoise reference code in response to a loop error signal;
    (b) forming signals representing the sum and the difference between two selected bits of the pseudonoise reference code;
    (c) forming a first product signal from the sum signal and the incoming signal;
    (d) forming a second product signal from the difference signal and the incoming signal;
    (e) forming the loop error signal from the first and second product signals to cause said step of generating.

12. The tracking apparatus of claim 1, wherein said step of forming signals representing the sum and difference comprises:
    (a) forming the sum of the two selected bits of the pseudonoise reference code; and
    (b) forming the difference between the two selected bits of the pseudonoise reference code.

13. The method of claim 12, wherein the pseudonoise code is a sequence of n bits, n being a positive integer, and said step of forming sum and difference signals comprises:
    forming signals representing the sum and the difference between the contents of stages n and n−1 of said shift register.

14. The method of claim 13, wherein said step of forming comprises:
    forming signals representing the sum and the difference between the contrents of stages n and n−y, wherein y is an integer greater than 1 but less than n.

15. The method of claim 11, wherein said step of forming the loop error signal comprises:
    multiplying the first and second products signals together to form the loop error signal.

* * * * *